United States Patent
Barenz et al.

(10) Patent No.: US 8,426,820 B2
(45) Date of Patent: Apr. 23, 2013

(54) IMAGE SENSOR SYSTEM

(75) Inventors: Joachim Barenz, Überlingen (DE);
Frank Zehetmair, Überlingen (DE);
Hans Dieter Tholl,
Uhldingen-Mühlhofen (DE)

(73) Assignee: Diehl BGT Defence GmbH & Co. KG,
Ueberlingen (DE)

( * ) Notice: Subject to any disclaimer, the term of this patent is extended or adjusted under 35 U.S.C. 154(b) by 383 days.

(21) Appl. No.: 12/417,197

(22) Filed: Apr. 2, 2009

(65) Prior Publication Data

US 2009/0250614 A1 Oct. 8, 2009

(30) Foreign Application Priority Data

Apr. 7, 2008 (DE) .......................... 10 2008 017 585

(51) Int. Cl.
*G01J 5/02* (2006.01)
(52) U.S. Cl.
USPC ........................................................ 250/352
(58) Field of Classification Search .......... 250/330–335,
250/336.1–336.2, 338.1–338.5, 339.01–339.15,
250/340, 341.1–341.8, 342–353, 354.1
See application file for complete search history.

(56) References Cited

U.S. PATENT DOCUMENTS

| | | | |
|---|---|---|---|
| 4,670,653 A * | 6/1987 | McConkle et al. | 250/330 |
| 4,933,555 A | 6/1990 | Smith | |
| 5,114,238 A * | 5/1992 | Sigler | 359/399 |
| 5,149,970 A | 9/1992 | Whitney | |
| 5,155,363 A | 10/1992 | Steinbichler et al. | |
| 5,572,312 A | 11/1996 | Karlsson et al. | |
| 6,184,529 B1 * | 2/2001 | Contini | 250/347 |
| 7,495,220 B2 * | 2/2009 | Blackwell et al. | 250/338.1 |
| 2003/0020017 A1 * | 1/2003 | Cole | 250/338.1 |
| 2005/0061977 A1 * | 3/2005 | Carr | 250/338.1 |
| 2005/0199815 A1 * | 9/2005 | Murakumo et al. | 250/354.1 |

FOREIGN PATENT DOCUMENTS

| | | |
|---|---|---|
| DE | 19833596 A1 | 2/2000 |
| DE | 10137719 A1 | 2/2003 |
| EP | 0419936 A1 | 4/1991 |
| FR | 2477349 A1 | 9/1981 |
| GB | 2200813 A | 8/1988 |
| WO | 9324815 A1 | 12/1993 |

* cited by examiner

*Primary Examiner* — Kiho Kim
(74) *Attorney, Agent, or Firm* — Laurence A. Greenberg; Werner H. Stemer; Ralph E. Locher

(57) ABSTRACT

An image sensor system includes a detector having a plurality of detector elements and optics having a beam path from an optical element on to the detector. Calibration of the detector can be rapidly effected where the image sensor system has a reference radiating device fixed within the beam path for illuminating the detector elements.

17 Claims, 2 Drawing Sheets

IMAGE SENSOR SYSTEM

CROSS-REFERENCE TO RELATED APPLICATION

This application claims the priority, under 35 U.S.C. §119, of German patent application DE 10 2008 017 585.4, filed Apr. 7, 2008; the prior application is herewith incorporated by reference in its entirety.

BACKGROUND OF THE INVENTION

Field of the Invention

The invention concerns an image sensor system including a detector having a plurality of detector elements and an optics having a beam path from an optical element on to the detector.

Modern image sensor systems are increasingly based on infrared matrix detectors in which a large number of detector cells which are sensitive in the infrared spectral range are arranged in mutually juxtaposed relationship in a matrix to record individual pixels. Such infrared matrix detectors are known from thermal imaging devices for use in the automotive field or in inspection. To increase efficiency the infrared matrix detectors can include a cooling device for cooling the detector, with which the detector cells, prior to each use, can be cooled down to a temperature of between 50 K and 150 K.

In the case of high-power infrared matrix detectors it is noticeable that the signal from the detector cells is dependent on the working temperature. With a fluctuating temperature, images of the same scenery but of different imaging quality are produced. Spatial non-homogeneities are also added as a further difficulty as the behavior of the detector cells is not exactly the same as each other and different temperatures can have different influences on individual detector cells. Moreover, detector cells which are sensitive in the infrared spectral range present non-linearities in respect of the characteristic curve, which can also be slightly different from one detector cell to another. While the parameter of the working temperature can be stabilized by structural and conceptual measures, in particular spatial non-homogeneities and non-linearities lead to unwanted image disorders.

To reduce those image disorders it is known to calibrate infrared matrix detectors at one or more working temperatures and at one or more points on their characteristic and to transfer the calibration results for example by interpolation on to the entire working range. It will be noted however that such a calibration procedure has to be repeated from time to time as the behavior of the detector cells in relation to time is usually not stable. In the case of image sensors which have a particularly high level of resolution or are particularly sensitive, adjustment correction has to be effected in each new cooling cycle.

It is also known for the detector to be calibrated during operation on the basis of the recorded scenery. Such a calibration procedure is based on the assumption that, when recording a moving scenery, the highest and lowest levels of light intensity and the mean levels of light intensity are equal on all detector elements during a sufficient long period of time. Based on those minima, maxima and mean values which are assumed to be equal, the detector elements are correspondingly calibrated to equal output signals or mean values. In that way the detector can be continuously calibrated during operation.

SUMMARY OF THE INVENTION

It is accordingly an object of the invention to provide an image sensor system, which overcomes the above-mentioned disadvantages of the heretofore-known devices and methods of this general type and which allows the image sensor system to be rapidly and accurately calibrated.

With the foregoing and other objects in view there is provided, in accordance with the invention, an image sensor system, comprising:
 a detector having a plurality of detector elements;
 optics defining a beam path from an optical element on to said detector; and
 a reference radiating device disposed within said beam path for illuminating said detector elements.

In other words, the objects of the invention are achieved by an image sensor system of the kind set forth in the introductory paragraphs above and, which in accordance with the invention has a reference radiating device fixed within the beam path for illuminating the detector elements.

The invention is based in this respect on the consideration that scenery-based calibration—in dependence on the algorithm used—requires a high level of computing power to arrive at a good result. Or, a prolonged period of time, or the assumption of a relatively large number of images, is required, until the system is in a steady-state condition and calibration can be effected with a good result. It is possible to dispense with the high computing power or the wait until the system is in the steady-state condition, if the detector elements are illuminated with an external calibration radiating device having a plurality of radiation levels so that it is possible to assume that there is uniform irradiation over all detector elements and the output values obtained from the detector elements can be calculated in relation to the correction data.

The calibration operation can be carried out particularly quickly if the reference radiating device is integrated in the image sensor system. It is possible to dispense with aligning the reference radiating device on to the detector from the outside and calibration can be rapidly effected. If in that case the reference radiating device is fixed within the beam path, the time required for a calibration operation can be still further reduced as there is no need for the reference radiating device to be moved into the beam path. In that respect the reference radiating device can be rigidly fixed to optical elements of the optics.

The detector elements are desirably detector cells which each in themselves produce a picture element or pixel. The optical elements of the optics can be beam shaping elements which deflect and shape the optical radiation in accordance with the beam path, for example focus it. The detector advantageously has its highest level of sensitivity in the infrared spectral range and is connected to a cooling system for cooling the detector elements to below at least 150 K.

In an advantageous embodiment of the invention the reference radiating device is adapted for illuminating the detector elements during an operation of imaging surroundings through the optics on to the detector elements. The calibration operation can be carried out when the incidence of light from the surroundings is masked or during a moment involving little or no light incidence from the surroundings, and can thus be effected very quickly and without switching over elements.

Due to the arrangement of the reference radiating device in the beam path of the optics, shadowing effects can occur because of the reference radiating device: the reference radiating device causes vignetting in respect of the beam path with a negative effect in terms of the quality of the image of the scenery on the detector. That disadvantage can be avoided if the reference radiating device is disposed in a central masking-out part of the optics.

The invention is particularly suitable for use together with a catadioptic optics. The reference radiating device can here be arranged between mirrors, in particular in a central masking-out part, and the image sensor system can be of a particularly compact configuration, which is advantageous in particular for mobile uses. If the optics is a Cassegrain optical system it is possible to achieve a compact structure with a high radiation yield in the case of a non-vignetting reference radiating device.

In order to be able to carry out a calibration operation with calibration values which are a good match, the reference radiating device should uniformly illuminate the detector elements over the entire sensitive area of the detector. To achieve that the reference radiating device can include an optical element for producing the image of a radiation emitting element of the reference radiating device in an exit pupil of the optics. The fact of producing the image in the exit pupil makes it possible to achieve a beam path which is complementary to the beam path of the optics. Accordingly, particular homogeneous illumination can be effected where the beam path of the optics is focused, that is to say on the detector elements. The optical element or the beam shaping element can be a lens.

Depending on the respective nature of the radiation emitting element in the form of a thermal radiating device, a line radiating device or a quantum emitter the spatial radiation emission characteristic may already be non-homogeneous. If the reference radiating device has an optical element for spatial homogenization of a non-homogeneous emitted radiation from the reference radiating device, uniform illumination of the detector or the detector elements can be achieved in spite of a non-homogeneous radiation emission characteristic, for example by mode distribution of a diode. The optical element can be a beam shaping element, the surface of which is for example in the form of a diffractive surface, for example in the form of a grating.

A further advantageous configuration of the invention provides that the reference radiating device has a radiation emitting element which is in the form of a thermal radiating device. It is possible for example to use a tungsten layer as the thermal radiating device. The wide spectrum of the thermal radiating device prevents the radiation emission spectrum of the radiation emitting element already departing from the sensitivity spectrum of the detector, when minor thermal fluctuations are involved. If the radiation emitting element is in the form of a doped non-conductor, it can be small in spite of a high level of radiation emission power and can thereby have a low absolute thermal capacity with a high level of thermal conductivity. In that way it is possible to very rapidly implement a change in the radiation emission power so that calibration can take place very rapidly at different levels of illumination power. As the doped non-conductor, it is possible for example to use a doped diamond layer of 'DLC' type (i.e., diamond-like carbon), in other words, amorphous carbon material with some properties of natural diamond.

In another configuration of the invention the reference radiating device has a quantum emitter, in particular a diode, as the radiation emitting element. That makes it possible to produce particularly rapid changes in reference flux.

Advantageously the image sensor system is equipped with a regulating device for regulating a radiation characteristic—such as for example the intensity—of the reference radiating device in dependence on a detector signal. The radiation characteristic can be adapted to desired calibration points without having to store corresponding correspondence data in respect of calibration points in relation to radiation characteristics which in addition can become inaccurate due to external influences or ageing phenomena.

In order to avoid a dependency in respect of calibration on the parameter of the integration duration, it is advantageous to produce different calibration points, for example with different degrees of filling or currents in respect of the detector cells, with the same integration duration. For that purpose the regulating device is advantageously provided to regulate the radiation characteristic of the reference radiating device in such a way that a plurality of different output characteristics of the detector elements are successively achieved, with the same integration time. The output characteristics can be for example different degrees of filling or currents of the detector cells.

A variation in the beam characteristic with which the detector elements are illuminated for carrying out the calibration procedure can be achieved without a variation in the radiation emission characteristic of the reference radiating device or can be even further extended, with a variation in the radiation emission characteristic of the reference radiating device, if the image sensor system has an optical device for a variation in a beam characteristic in respect of the illumination of the detector elements by the reference radiating device. The optical device can include one or more optical elements, for example a lens when varying a beam angle, a filter when varying a wavelength or a controllably driven motion means for moving the optical element upon a variation in respect of time of the reference radiation.

Control of the calibration procedure is desirably implemented by a processing means for calibration of the detector, which is provided in particular for carrying out a multi-point calibration operation with a single integration duration.

Advantageously the processing means is provided for controlling the irradiation of the detector elements by the radiation source, that is to say for example for controlling a radiation emission characteristic of the reference radiating device and/or for controlling the optical device for varying the radiation.

A spatially non-homogeneous radiation emission characteristic of the reference radiating device, for example due to modes of the reference radiating device, can ruin uniform illumination of the detector. That disadvantage can be obviated or alleviated if the processing means is provided for controlling a movement of an optical element for moving the illumination of the reference radiating device on the detector. By the movement of the illumination, for example what is referred to as 'dithered scanning', the non-homogeneity can be spread over and possibly completely compensated. That means that it is possible to achieve an increase in homogeneity.

A further advantageous development of the image sensor system is that the processing means is provided for firstly implementing calibration by means of the reference radiating device and then effecting post-calibration on the basis of the incidence of radiation from a recorded scenery. Thus it is possible to effect sliding post-calibration, that is to say post-calibration involving tracking correction in respect of time, after for example a first image sequence or an image has already been registered. Changes in the behavior of the detector, for example a failure of detector elements, can be continuously monitored and it is possible to achieve a particularly good recording quality on the part of the image sensor system.

Further advantages will be apparent from the following description of the drawing. Embodiments by way of example of the invention are illustrated in the drawing. The drawing and the description contain numerous features in combination which the man skilled in the art will suitably also consider individually and combine to form further appropriate combinations.

Other features which are considered as characteristic for the invention are set forth in the appended claims.

Although the invention is illustrated and described herein as embodied in an image sensory system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
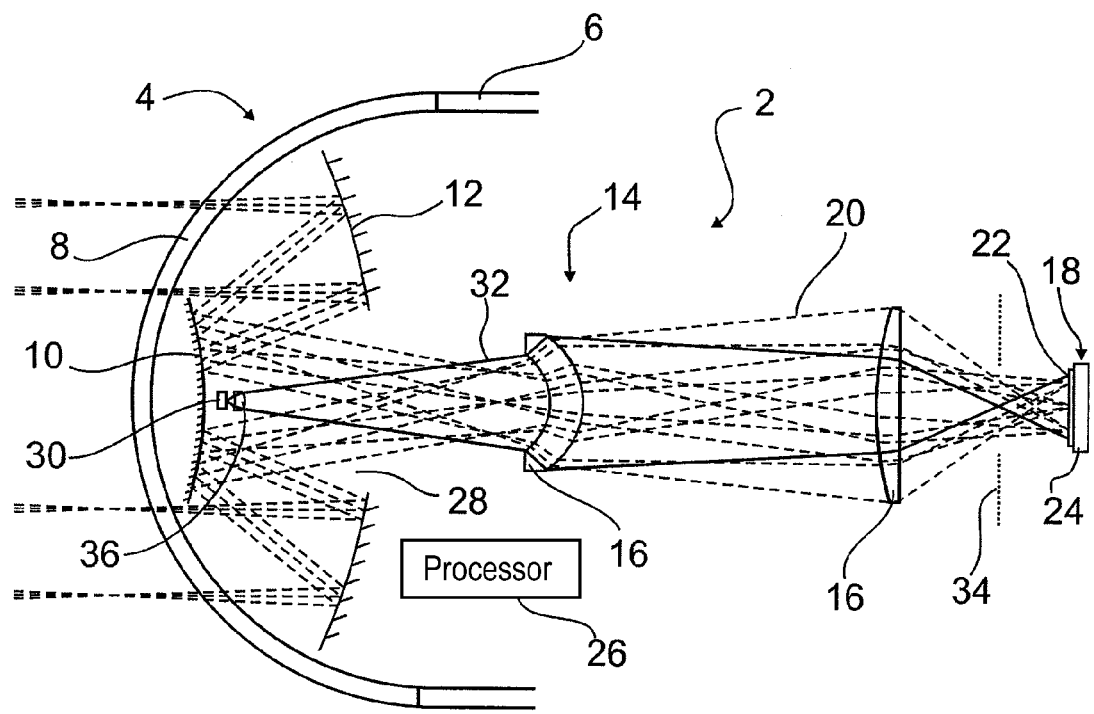
FIG. 1 shows an image sensor system with a reference radiating device in a central masking-out part of an optical system.

Referring now to the figures of the drawing in detail and first, particularly, to FIG. 1 thereof, an image sensor system 2 in a missile 4 which is only diagrammatically indicated by reference to a housing portion 6. Two mirrors 10, 12 are disposed behind a dome 8 which is transparent for infrared radiation. The two mirrors 10, 12 form the optical elements of a catadioptic (i.e., catadioptric) optics 14 forming a Cassegrain optical system. By means of further optical elements 16 the optics 14, also referred to as an optical device or optical system, produces the image of a surrounding scenery on a detector 18, as indicated by broken lines, which represent by way of example the beam path 20 of the optics 14. The detector 18 is a matrix detector whose detector elements 22 are sensitive in the infrared spectral range. The detector elements 22 are cooled during operation to a temperature of between 80 K and 120 K by a cooling system 24, the temperature of the detector elements 22 being monitored by a processing means 26, such as a processor unit or, simply, a processor.

The mirror 12 is interrupted in its central region, as can be seen from the sectional view in FIG. 1. The outer region of the mirror 12 is disposed in an annular configuration around the central masking-out part 28 formed in that way. A reference radiating device 30 is fixed immovably relative to the optics 14 or the optical elements 16, within the central masking-out part 28—and thus also within the beam path 20 surrounding the central masking-out part 28. The reference radiating device 30 is provided to produce reference radiation 32 which is also established in the spectral range in which the detector elements 22 are sensitive. The reference radiation 32 is deflected on to the detector 18 by an optical element 36 which is only associated with the reference radiating device 30 and which is inaccessible to the beam path 20 from the scenery, and by optical elements 16 of the optics 14.

By virtue of the arrangement of the reference radiating device 30 in the central masking-out part 28 the reference radiating device 30 is suitable for illuminating the detector 18 without previous movement into a beam path 20. Illumination of the detector 18 or the detector elements 22 thereof would also be possible simultaneously with the image of a surrounding scenery being produced by the optics 14 on the detector elements 22. The optical element 30 is so designed, together with the optics 14, that the reference radiating device 30 is projected on to an exit pupil 34 of the beam path 20 or the optics 14, indicated in FIG. 1 by a broken-line plane. The beam configuration of the reference radiation 28 is complementary to the beam path 20 by virtue of focusing of the reference radiation 32 in the exit pupil 34 in which beams from the scenery are of great homogeneity. The reference radiation 32 is focused in the imaging, at the point where the beam path 20 is homogeneous, with the effect that the reference radiation 32 is particularly homogeneous at the location where the beam path 20 is focused in its image, namely on the detector cells 22. That provides for particularly uniform distribution of the reference radiation 32 on the detector cells 22.

Figure 2:
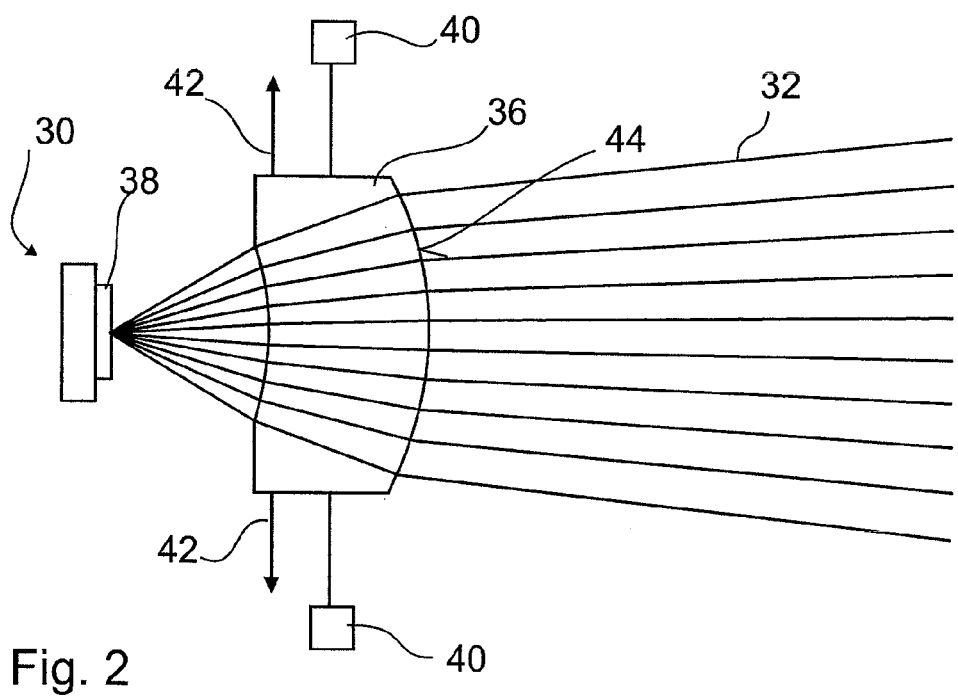
FIG. 2 shows the reference radiating device of FIG. 1 with a movable optical element.

The reference radiating device 30 and the optical element 36 are shown diagrammatically and on an enlarged scale in FIG. 2. The reference radiating device 30 includes a radiation emitting element 38 which is in the form of an LED and which is connected to the processing means 26 by way of a line (not shown). The processing means 26 is adapted to control the strength of a radiation flux from the radiation emitting element 38 as well as its being switched on and off.

Arranged in front of the reference radiating device 30 is the optical element 36 which is in the form of a lens and which collects and orients radiation from the radiation emitting element 38. The optical element 36 is movable in a direction 42 transversely with respect to the radiation emitting axis of the radiation emitting element 38 by way of a drive 40, or motion means 40, which are only diagrammatically indicated and which for example can be in the form of a micromotor or piezoelectric element. In that way the reference radiation 32 which can be non-homogeneous due to modes of the radiation emitting element 38 in respect of its spatial distribution can be spread on the detector elements 22 in order in that way to achieve greater homogeneity in the reference radiation 32 on the detector elements 22. Alternatively or additionally the optical element 36 is already designed in itself for spatial homogenization of a mode distribution of the radiation emitting element 38. For that purpose, on its surface 44, the element 36 includes diffractive elements for example in the form of a grating structure. The beam path of the reference radiation can be somewhat deflected by diffraction by means of a diffractive surface, thereby rendering uniform a spatial non-homogeneity in the reference radiation 32, which is caused by the radiation emission characteristic of the radiation emitting element 38.

Prior to operation of the image sensor system 2 for forming the image of the surrounding scenery on the detector 18 the processor or processing means 26 implements calibration of the detector 18 inclusive of defective pixel detection. For that purpose the reference radiating device 30 is activated by the processing means 26—for example when there is an interruption in or a low level of incident radiation from the scenery—and it thereupon emits the reference radiation 32. That is homogenized by the element 36 and optionally additionally by the dither movement thereof controlled by the processing means 36 and impinges uniformly on the detector 18.

Figure 3:
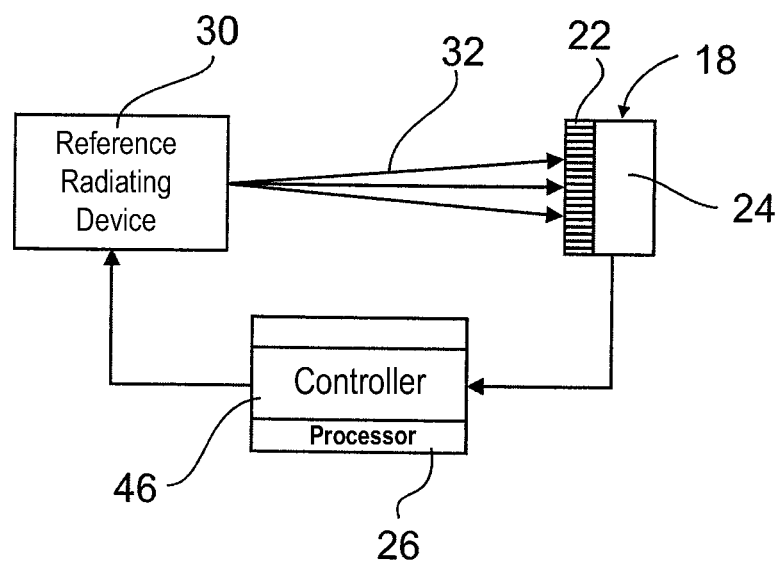
FIG. 3 shows a diagrammatic view of a regulating circuit.

That operation is diagrammatically shown in FIG. 3. The processing means 26 now performs a calibration process for calibration of the detector 18. For that purpose the current from the detector elements 22 is detected by the processing means 26 with a fixed integration time and the radiation strength of the reference radiation 32 is controlled by a closed-loop controller 46 or regulator 46 of the processing means 26 by suitable actuation of the reference radiating device 30 until the current from the detector elements 22 attains on average a predetermined value. Instead of the current it is possible to use the degree of filling of the detector elements 22. That value serves as a first calibration point and on the basis of the currents from the detector elements 22 the processing means 26 determines correction factors for the individual detector elements 22. In addition the processing means 26 finds defective detector cells 22 which for example output no current or a current which cannot be evaluated. The current of all detector elements 22 should be equal with uniform irradiation of the detector elements 22. As that is in reality not the case due to inaccuracies the correction factors serve to eliminate or at least alleviate the effects of inaccuracies in the image of the scenery.

When the calibration step at the first calibration point is concluded the radiation intensity of the reference radiating device 30 is regulated to a second value. That is effected by the average current from the detector elements 22 being detected with the same integration time and the radiation intensity being regulated until the current has reached a fixed second value. The next calibration step now takes place at that second calibration point, involving ascertaining the correction factors for the individual detector elements 22 for the second point. Further calibration steps can be carried out with other levels of radiation intensity for affording 3-point calibration, 4-point calibration, and so forth.

Multi-point calibration can then be concluded by computing steps in which the rise in the current with radiation intensity and offset is ascertained for each detector element 22. For example all further working points with the same integration time can be ascertained by interpolation. Further calibration steps with one or preferably a plurality of intensity points can now be carried out, with one or more other integration times, for increasing the accuracy of the detector 18 or for image generation with further integration times.

After that the image sensor system 2 goes into the receiving mode in which the image of the surrounding scenery is produced on the detector 18. After a predetermined period of operation post-calibration can be carried out, on the basis of radiation incidence from the recorded scenery, for example on the assumption that the radiation minima and maxima on all detector elements 22 are the same over a prolonged period of time, with moving scenery. The occurrence and implementation of that further calibration procedure are controlled by the processing means 26.

After a pause in operation and after renewed cooling and after the detector 18 has been brought into operation again, a residual non-homogeneity can remain in the detector elements 22 relative to each other. That can be corrected by a renewed calibration operation. In that case it is possible to dispense with calibration with a plurality of integration times and markedly faster calibration can be effected with just one integration time. The ascertained data or correction factors can be used to correct the correction sets previously ascertained with other integration times. In addition, that renewed internal calibration operation provides for detecting and correcting defective detector elements 22 which have freshly occurred due to the cooling cycle.

Figure 4:
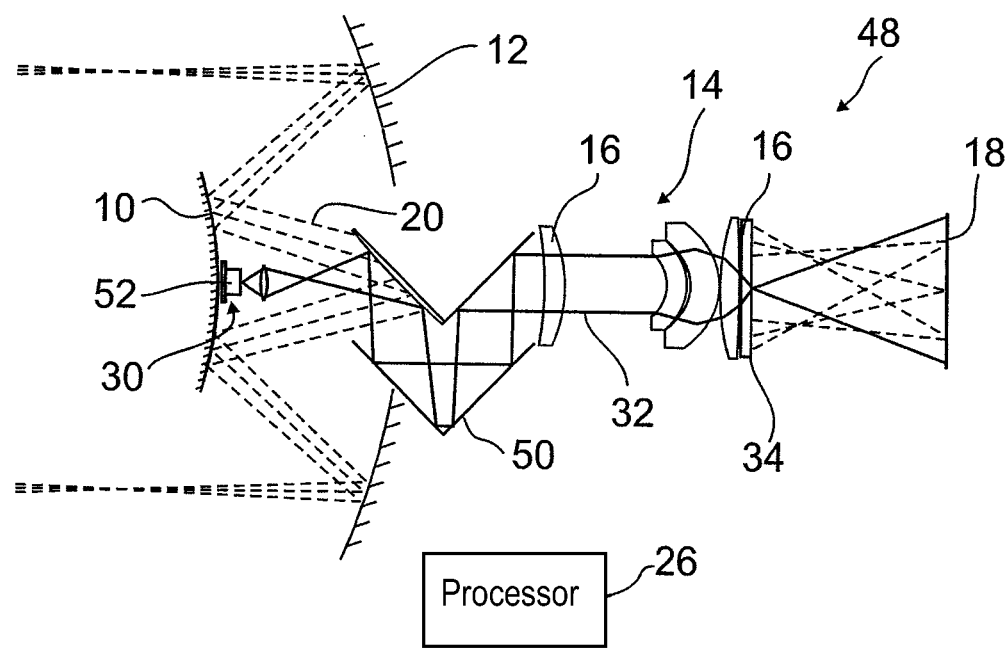
FIG. 4 shows another image sensor system with a reference radiating device in a central masking-out part of an optical system for orientation of a field of view.

FIG. 4 shows a further image sensor system 48. The description hereinafter is restricted essentially to the differences in relation to the embodiment shown in FIGS. 1 to 3, to which attention is directed in regard to features and functions which remain the same. Components which are substantially the same are basically denoted by the same references and features which are not mentioned are incorporated in the following embodiment without being described afresh. The optics 14 includes a rotatable mirror system 50, by which the field of vision of the optics 14 is movable within the surrounding scenery. The exit pupil 34 is within an optical element 16 of a lens system of the optics 14. The reference radiating device 30 includes a temperature radiating device 52 as a radiation emitting element which is in the form of a doped non-conductor, for example in the form of a doped diamond layer, what is referred to as a DLC layer.

The processing means 26 controls or regulates the radiation emission strength and radiation emission frequency by means of a voltage which is applied at the temperature radiating device and heats it. The thin configuration of the temperature radiating device provides that a change in the radiation emission characteristic can take place very quickly so that multi-point calibration can be effected rapidly.

The invention claimed is:

1. An image sensor system, comprising:
a detector having a plurality of detector elements;
optics defining a beam path from an optical element on to said detector; and
a reference radiating device disposed within said beam path for illuminating said detector elements with reference radiation forming a calibration beam;
said detector elements adapted to output a plurality of electronic signals;
wherein said reference radiating device is disposed in a central masking-out part of said optics.

2. The image sensor system according to claim 1, wherein said detector elements are configured to have a higher sensitivity in an infrared spectral range than in any other spectral range, and further comprising a cooling system for cooling said detector elements.

3. The image sensor system according to claim 1, wherein said reference radiating device is configured to illuminate said detector elements while a surroundings is being imaged through said optics onto said detector elements.

4. The image sensor system according to claim 1, wherein said optics is a catadioptic optics.

5. The image sensor system according to claim 1, wherein said optics includes a Cassegrain optical system.

6. The image sensor system according to claim 1, wherein said optics include an exit pupil, and said reference radiating device includes an optical element for producing an image of a radiation emitting element of said reference radiating device on said exit pupil of said optics.

7. The image sensor system according to claim 1, wherein the plurality of electronic signals are current signals.

8. An image sensor system, comprising:
a detector having a plurality of detector elements;
optics defining a beam path from an optical element on to said detector; and
a reference radiating device disposed within said beam path for illuminating said detector elements;
wherein said reference radiating device includes an optical element for spatially homogenizing a non-homogeneous radiation emission from a radiator of said reference radiating device.

9. The image sensor system according to claim 1, wherein said reference radiating device has a thermal radiating device forming a radiation emitting element thereof.

10. The image sensor system according to claim 1, wherein said reference radiating device has a diode forming a radiation emitting element thereof.

11. The image sensor system according to claim 1, which further comprises a closed-loop controller for controlling a radiation characteristic of said reference radiating device in dependence on a detector signal.

12. An image sensor system, comprising:
a detector having a plurality of detector elements;
optics defining a beam path from an optical element on to said detector;
a reference radiating device disposed within said beam path for illuminating said detector elements; and
a closed-loop controller for controlling a radiation characteristic of said reference radiating device in dependence on a detector signal;
wherein said close-loop controller is configured to regulate a radiation characteristic of said reference radiating device such that a plurality of different output characteristics of said detector elements are successively attained with the same integration time.

13. An image sensor system, comprising:
a detector having a plurality of detector elements;
optics defining a beam path from an optical element on to said detector;
a reference radiating device disposed within said beam path for illuminating said detector elements; and
an optical device configured to vary a radiation characteristic of the illumination of said detector elements by said reference radiating device.

14. An image sensor system, comprising:
a detector having a plurality of detector elements;
optics defining a beam path from an optical element on to said detector;
a reference radiating device disposed within said beam path for illuminating said detector elements with reference radiation; and
a processor for calibration of said detector;
wherein said processor is provided for performing multi-point calibration on the basis of a single integration time.

15. The image sensor system according to claim 14, wherein said processor is provided for controlling the irradiation of said detector elements by said radiation source.

16. An image sensor system, comprising:
a detector having a plurality of detector elements;
optics defining a beam path from an optical element on to said detector;
a reference radiating device disposed within said beam path for illuminating said detector elements; and
a processor for calibration of said detector;
wherein said processor is provided to control a movement of an optical element for movement of the illumination of said reference radiating device on said detector.

17. An image sensor system, comprising:
a detector having a plurality of detector elements;
optics defining a beam path from an optical element on to said detector;
a reference radiating device disposed within said beam path for illuminating said detector elements; and
a processor for calibration of said detector;
wherein said processor is provided to firstly effect calibration by means of said reference radiating device and then to perform post-calibration on the basis of the radiation incidence from a recorded scenery.

* * * * *